(12) United States Patent
Li et al.

(10) Patent No.: US 8,525,357 B2
(45) Date of Patent: Sep. 3, 2013

(54) PEDAL POWER GENERATING DEVICE

(75) Inventors: Hsin-Jen Li, Taichung (TW);
Shin-Sheng Lu, Taichung (TW)

(73) Assignee: Hsin-Jen Li, Taichung (TW)

( * ) Notice: Subject to any disclaimer, the term of this patent is extended or adjusted under 35 U.S.C. 154(b) by 493 days.

(21) Appl. No.: 12/955,916

(22) Filed: Nov. 30, 2010

(65) Prior Publication Data
US 2012/0133153 A1   May 31, 2012

(51) Int. Cl.
*H02P 9/04* (2006.01)

(52) U.S. Cl.
USPC .......................................... 290/1 C; 290/1 A

(58) Field of Classification Search
USPC .................. 290/1 A, 1 C; 318/141
See application file for complete search history.

(56) References Cited

U.S. PATENT DOCUMENTS

| | | | | |
|---|---|---|---|---|
| 3,573,479 A | * | 4/1971 | Rieth | 290/1 E |
| 4,105,314 A | * | 8/1978 | Hughes, Jr. | 353/85 |
| 4,227,092 A | * | 10/1980 | Campagnuolo et al. | 290/1 C |
| 4,360,860 A | * | 11/1982 | Johnson et al. | 362/192 |
| 6,034,492 A | * | 3/2000 | Saito et al. | 318/141 |
| 6,914,340 B2 | * | 7/2005 | Becker et al. | 290/1 R |
| 7,009,350 B1 | * | 3/2006 | Gold | 318/142 |
| 7,504,737 B2 | * | 3/2009 | Vasilovich et al. | 290/1 R |
| 7,608,933 B2 | * | 10/2009 | Yang | 290/1 C |

\* cited by examiner

*Primary Examiner* — Nicholas Ponomarenko

(57) ABSTRACT

A pedal power generating device includes a base having two supporting arms upwardly extending therefrom. The base has a gearbox mounted thereon. A pedal assembly is mounted between the two supporting arms. The pedal assembly has a pedal, a supporter extending from the pedal, a connecting rod assembled with the supporter and connected to the gearbox, and a twist spring mounted between the pedal and the two supporting arms. A transmitting assembly is mounted in the gearbox. The transmitting assembly includes a driver, a first gear train engaged with the driver, a second gear train engaged with the first gear train, and a steering gear set simultaneously engaging with the first gear train and the second gear train. A generator is mounted adjacent to the gearbox, and the generator has a rotor engaged with the second gear train.

7 Claims, 6 Drawing Sheets

PEDAL POWER GENERATING DEVICE

BACKGROUND OF THE INVENTION

1. Field of the Invention

The present invention relates to a generator, and more particularly to a pedal power generating device for providing effectively electricity.

2. Description of Related Art

The battery is the essential equipment of vehicle to provide stable electricity for actuating the vehicle. The vehicle has a generator for recharging the battery such that the battery is able to be continuously used.

However, when the vehicle is not used for a period of time, the electricity in the battery is gradually decreased. The voltage in the battery is lower than an essential voltage for actuating the vehicle such that the vehicle is not able to operate. Generally, it is need a pair of electrically connecting clamps for conducting electricity from another vehicle.

A conventional method to recharge the battery is to use the alternating current form home electricity supply. However, it is not inconvenient to recharge a vehicle outdoor.

The present invention has arisen to obviate/mitigate the disadvantages of the conventional recharge equipment.

SUMMARY OF THE INVENTION

The main objective of the present invention is to provide an improved pedal power generating device.

To achieve the objective, the pedal power generating device in accordance with the present invention comprises a base, a pedal assembly pivotally mounted on the base, a transmitting assembly mounted in the base, and a generator mounted on the base and connected to the transmitting assembly. The base has two supporting arms upwardly extending therefrom and a gearbox mounted thereon. The gearbox is positioned adjacent to one of the two supporting arms. The gearbox has a cover mounted thereon for sealing the gearbox. The pedal assembly is mounted between the two supporting arms. The pedal assembly has a pedal, a supporter extending from the pedal, a connecting rod assembled with the supporter and connected to the gearbox, and a twist spring mounted between the pedal and the two supporting arms for providing an elastic restoring force. The twist spring has two ends respectively abutted against the pedal and the supporting arm. The transmitting assembly is mounted in the gearbox. The transmitting assembly includes a driver, a first gear train engaged with the driver, a second gear train engaged with the first gear train, and a steering gear set simultaneously engaging with the first gear train and the second gear train. The driver has a driving wheel disposed thereon and extending from the gearbox. The driving wheel has an annular groove radially defined therein. The connecting rod is partially received in the groove and pivotally connected with the driving wheel. The driver has a driving gear disposed thereon and located adjacent to the driver wheel. The driving gear is engaged with the first gear train. The second gear train has a driven gear, a first pinion co-axially mounted on the driven gear, and a second pinion co-axially mounted on the first pinion. The first pinion has an one-way bearing mounted therein and the second pinion has an one-way bearing mounted therein. The one-way bearing of the first pinion has an operational direction opposite to that of the one-way bearing of the second pinion such that the first pinion is rotated opposite to the second pinion. The first pinion is engaged with the first gear train and the second pinion is engaged with the steering gear set. The generator is mounted adjacent to the gearbox. The generator has a rotor engaged with the second gear train. The rotor is engaged with the driven gear. The rotor has an extender sleeved thereon for restricting the rotor to correctly engage with the driven gear and extending from the cover. A freewheel is mounted on the cover and engaged with the extender such that the freewheel is simultaneously rotated with the rotor. The freewheel has a weight to providing an inertial motion such that the rotor is able to continuously rotate. A casing is mounted on the base for receiving the pedal assembly, the transmitting assembly, and the generator. The casing has an opening defined therein for receiving the pedal and allowing the pedal extending from the opening. The casing has a handle pivotally mounted thereon. The casing has two electrodes disposed thereon and electrically connecting with the generator for transmitting electricity to a battery of a vehicle.

The present invention will become more obvious from the following description when taken in connection with the accompanying drawings which show, for purposes of illustration only, a preferred embodiment in accordance with the present invention.

DETAILED DESCRIPTION OF THE INVENTION

Figure 1:
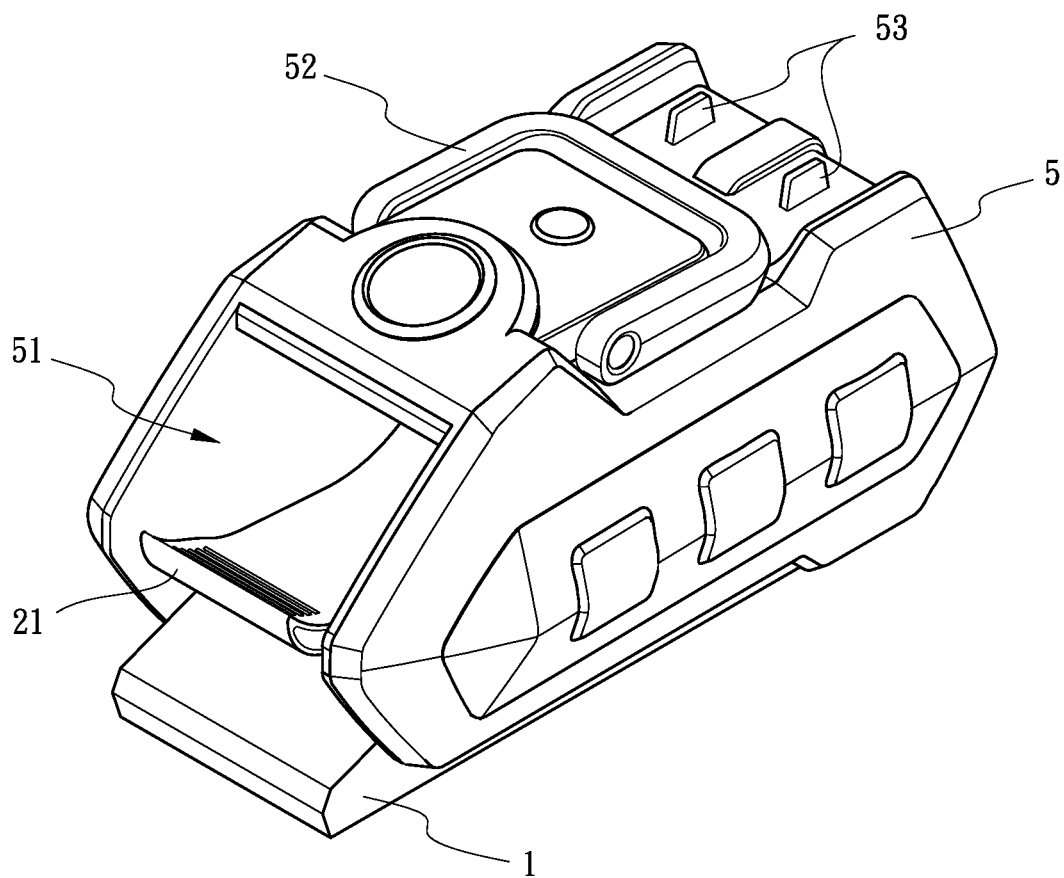
FIG. 1 is an assembled perspective view of a pedal power generating device in accordance with the present invention.
Figure 2:
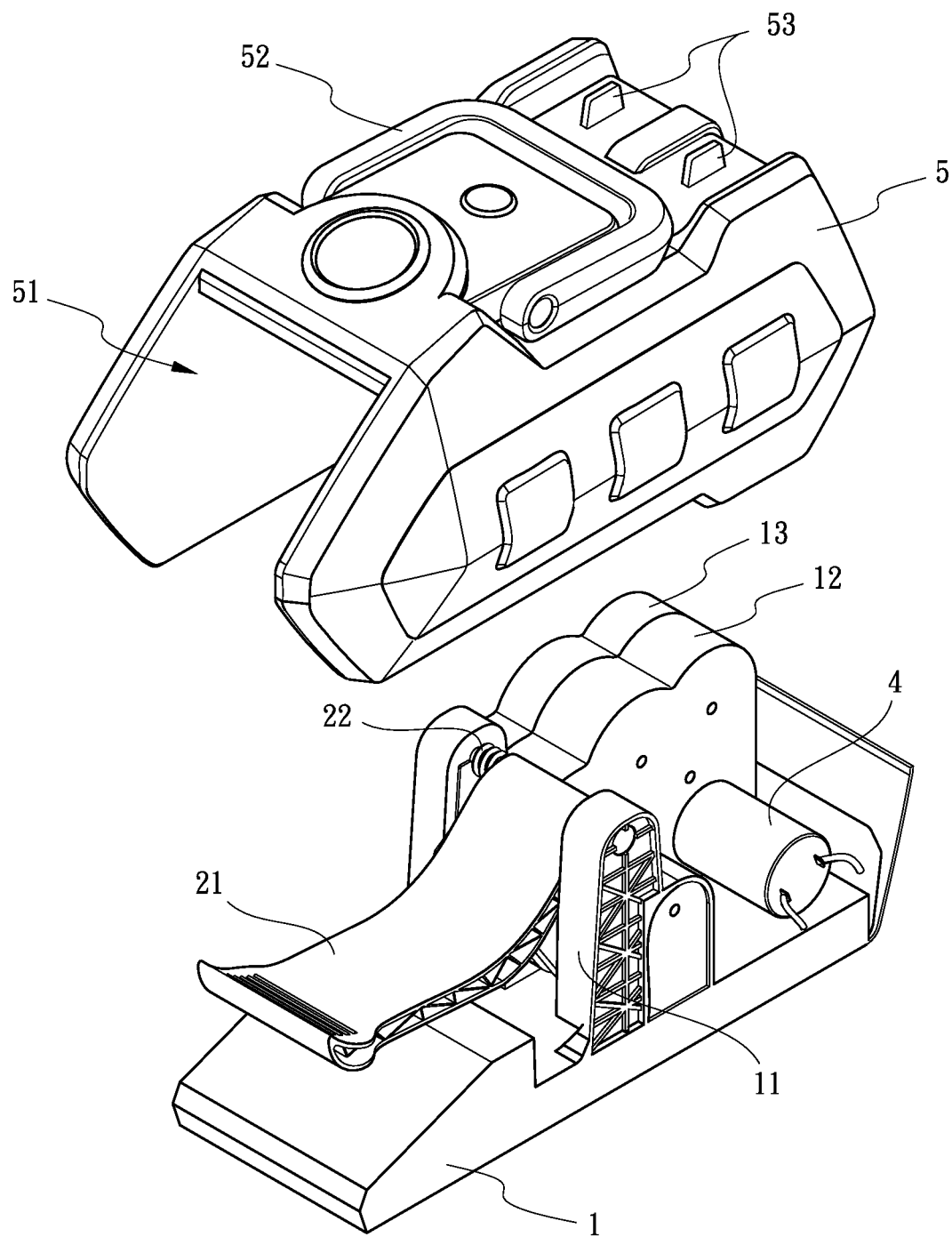
FIG. 2 is a partial exploded perspective view of the pedal power generating device in accordance with the present invention.
Figure 3:
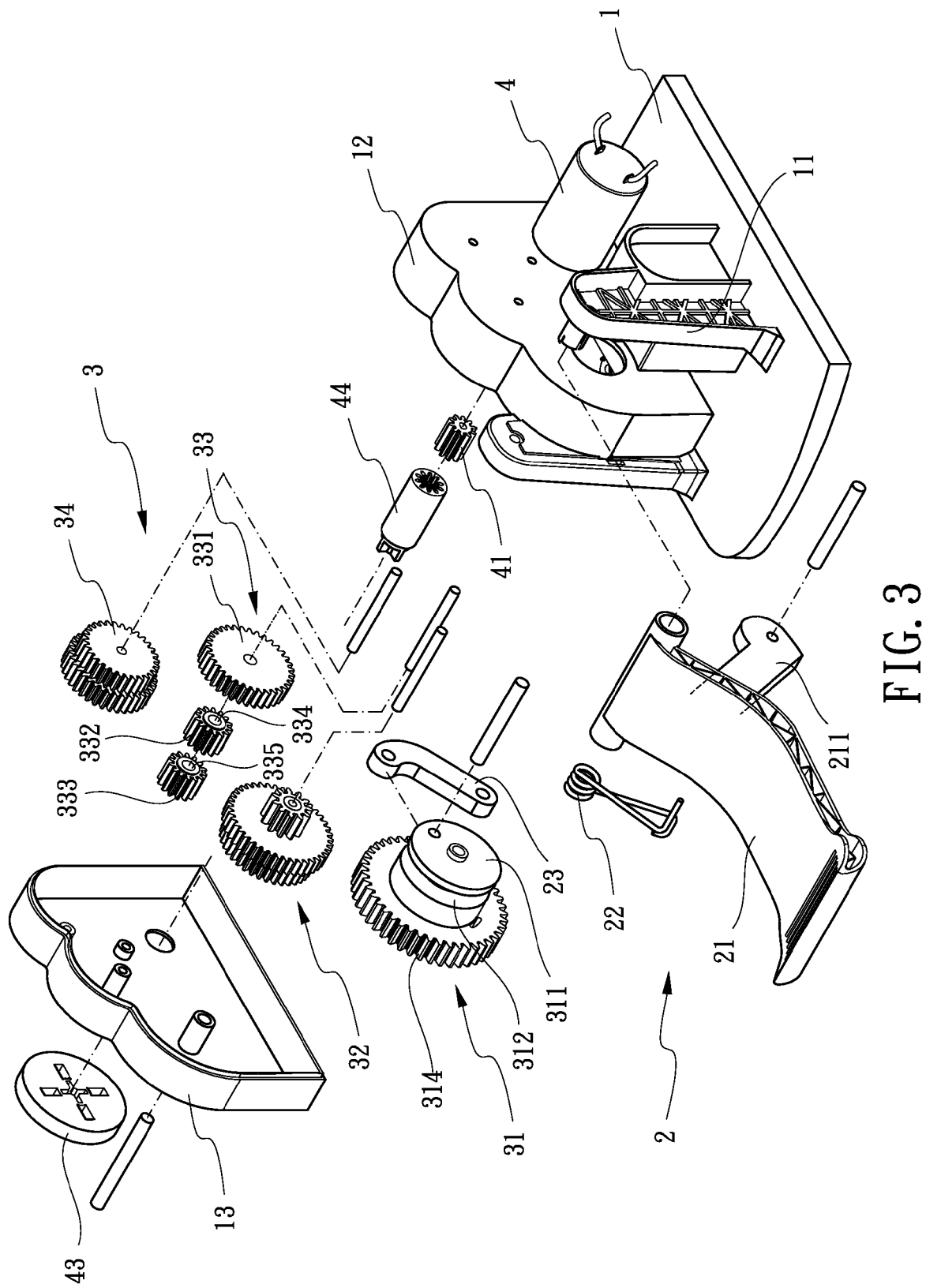
FIG. 3 is an exploded perspective view of the pedal power generating device in accordance with the present invention.
Figure 4:
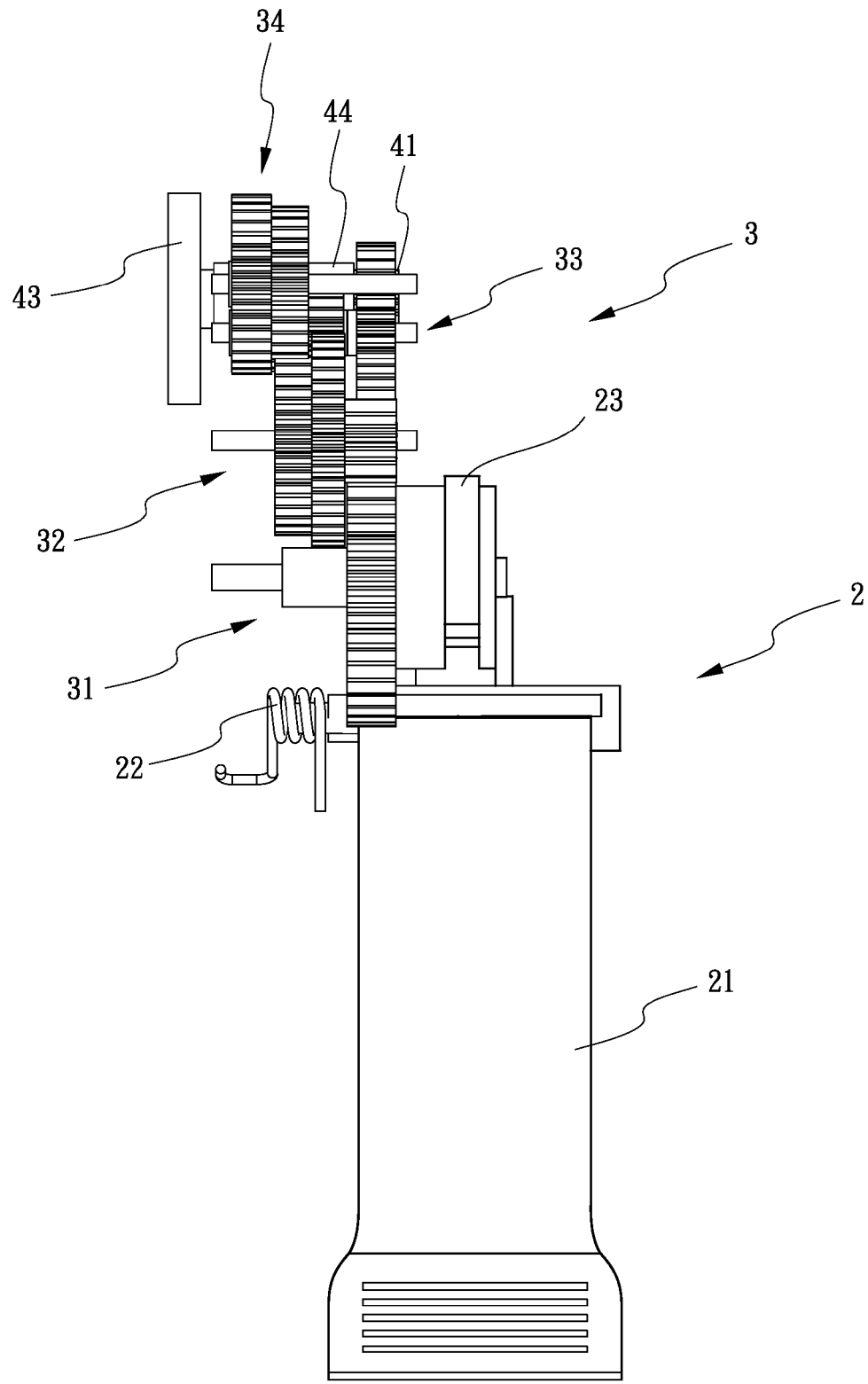
FIG. 4 is a top plan view of a pedal assembly assembled with a transmitting assembly of the pedal power generating device in accordance with the present invention.

Referring to the drawings and initially to FIGS. 1-4, a pedal power generating device in accordance with the present invention comprises a base 1, a pedal assembly 2 pivotally mounted on the base 1, a transmitting assembly 3 mounted in the base 1, and a generator 4 mounted on the base 1 and connected to the transmitting assembly 3.

The base 1 has two supporting arms 11 upwardly extending therefrom and a gearbox 12 mounted thereon. The gearbox 12 is positioned adjacent to one of the two supporting arms 11. The gearbox 12 has a cover 13 mounted thereon for sealing the gearbox 12.

The pedal assembly 2 is mounted between the two supporting arms 11. The pedal assembly 2 has a pedal 21, a supporter 211 extending from the pedal 21, a connecting rod 23 assembled with the supporter 211 and connected to the gearbox 12, and a twist spring 22 mounted between the pedal 21 and the two supporting arms 11 for providing an elastic restoring force. The twist spring 22 has two ends respectively abutted against the pedal 21 and the supporting arm 11.

The transmitting assembly 3 is mounted in the gearbox 12. The transmitting assembly 3 includes a driver 31, a first gear train 32 engaged with the driver 31, a second gear train 33 engaged with the first gear train 32, and a steering gear set 34 simultaneously engaging with the first gear train 32 and the second gear train 33. The driver 31 has a driving wheel 311 disposed thereon and extending from the gearbox 12. The driving wheel 311 having an annular groove 312 radially defined therein. The connecting rod 23 is partially received in the groove 312 and pivotally connected with the driving wheel 311. The driver 31 has a driving gear 314 disposed thereon and located adjacent to the driver 31 wheel. The driving gear 314 is engaged with the first gear train 32.

The second gear train 33 has a driven gear 331, a first pinion 332 co-axially mounted on the driven gear 331, and a second pinion 333 co-axially mounted on the first pinion 332. The first pinion 332 has an one-way bearing 334 mounted therein and the second pinion 333 has an one-way bearing 335 mounted therein. The one-way bearing 334 of the first pinion 332 has an operational direction opposite to that of the one-way bearing 335 of the second pinion 333 such that the first pinion 332 is rotated opposite to the second pinion 333. The first pinion 332 is engaged with the first gear train 32 and the second pinion 333 is engaged with the steering gear set 34.

The generator 4 is mounted adjacent to the gearbox 12. The generator 4 has a rotor 41 engaged with the second gear train 33. The rotor 41 is engaged with the driven gear 331. The rotor 41 has an extender 44 sleeved thereon for restricting the rotor 41 to correctly engage with the driven gear 331 and extending from the cover 13. A freewheel 43 is mounted on the cover 13 and engaged with the extender 44 such that the freewheel 43 is simultaneously rotated with the rotor 41. The freewheel 43 has a weight to providing an inertial motion such that the rotor 41 is able to continuously rotate.

A casing 5 is mounted on the base 1. The casing receives the pedal assembly 2, the transmitting assembly 3, and the generator 4. The casing 5 has an opening 51 defined therein for allowing the pedal 21 extending from the opening 51. The casing 5 has a handle 52 pivotally mounted thereon. The casing 5 has two electrodes 53 disposed thereon and electrically connecting with the generator 4 for transmitting electricity to a battery of a vehicle.

Figure 5:
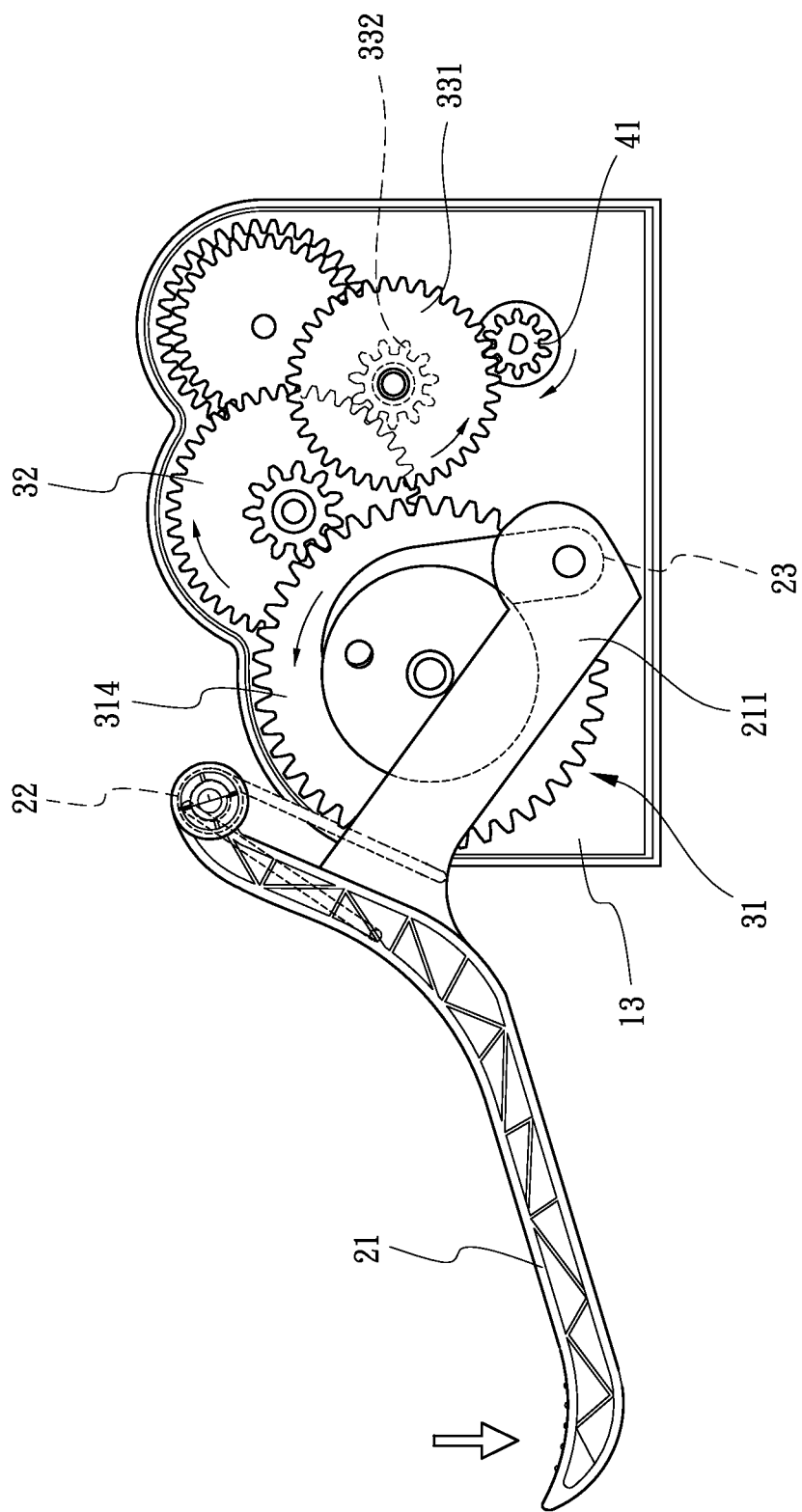
FIGS. 5-6 are operational views of the pedal power generating device in accordance with the present invention.
Figure 6:
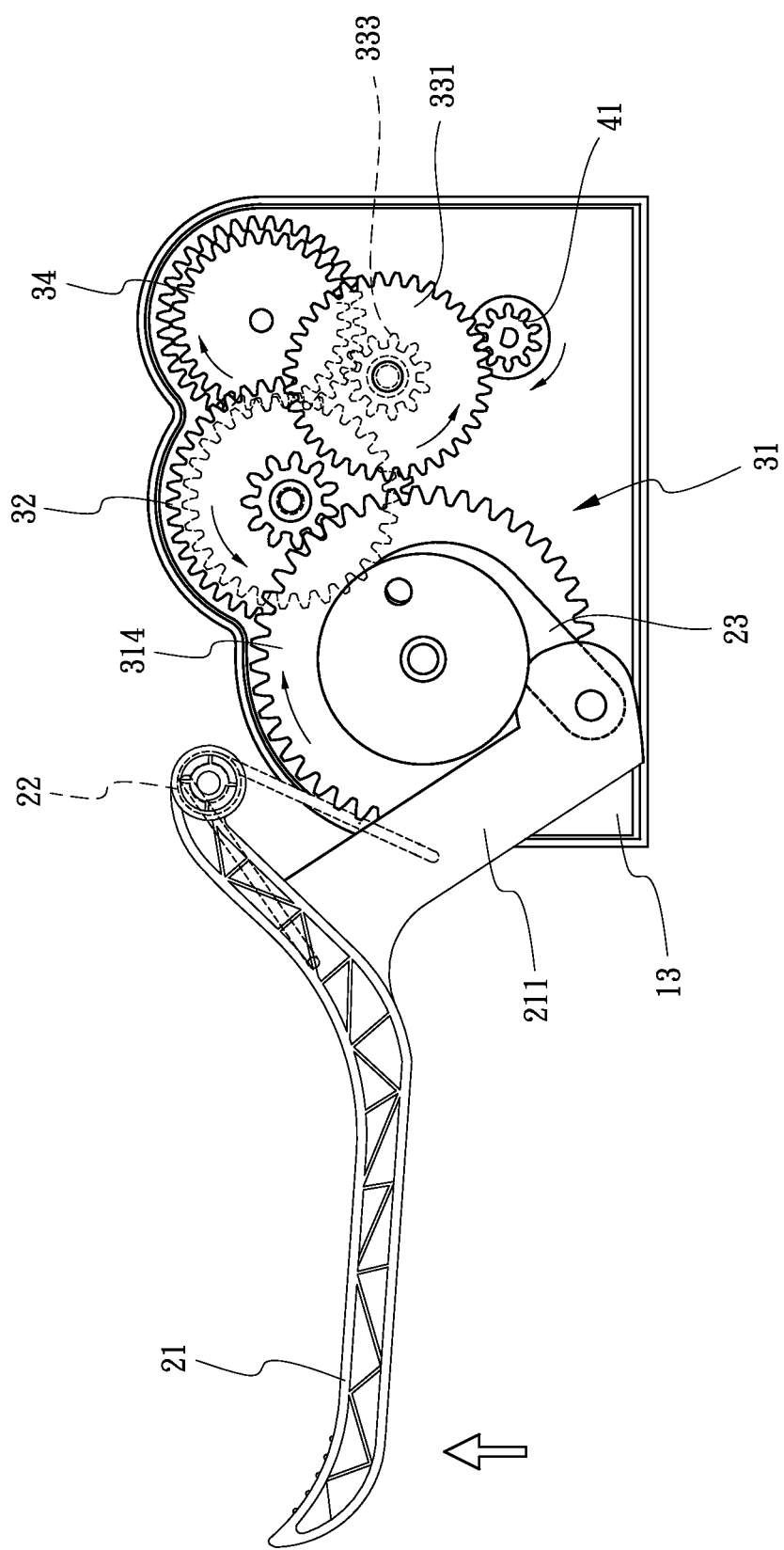

With reference to FIGS. 5 and 6, those show operational views of the present invention. When a user presses the pedal 21, as shown in FIG. 5, the pedal 21 compresses the twist spring 22 and relatively drives the connecting rod 23. The connecting rod 23 drives the driver 31 to rotate toward a first direction. The driving gear 314 is engaged with the first gear train 32 engaged with the first pinion 332. The first pinion 332 drives the driven gear 331 to engage with the rotor 41 for rotating the rotor 41 in a rotating direction to generate electric power. In the meanwhile, the second pinion 333 is idled due to the one-way bearing 335 of the second pinion 333. When the user releases the pedal 21, as shown in FIG. 6, the twist spring 22 is pushed the pedal 21 to be restored due to a restitution force of the twist spring 22. In the meantime, the supporter 211 of the pedal 21 pulls the connecting rod 23 back such that the connecting rod 23 drives the driver 31 to rotate toward a second direction opposite to the first direction. The driving gear 314 is engaged with the first gear train 32. The first gear train 32 is engaged with the steering gear set 34 engaged with second pinion 333. The second pinion 333 drives the driven gear 331 to continuously engage with the rotor 41 and the rotor 41 is rotated in the same rotating direction for continuously generating electric power. In the meanwhile, the first pinion 332 is idled due to the one-way bearing 334 of the first pinion 332.

During the movement of pressing and releasing the pedal 21, the transmitting assembly 3 is continuously engaged with the rotor 41 and the rotor 41 is continuously rotated in the same direction such that the electric power is continuously and stably generated to effectively provide an essential voltage of 13.4 V for the vehicle.

Although the invention has been explained in relations to its preferred embodiment, it is to be understood that many other possible modifications and variations can be made without departing from the spirit and scope of the invention as hereinafter claimed.

What is claimed is:

1. A pedal power generating device comprising:
   a base having two supporting arms upwardly extending therefrom, the base having a gearbox mounted thereon;
   a pedal assembly mounted between the two supporting arms, the pedal assembly having a pedal, a supporter extending from the pedal, a connecting rod assembled with the supporter and connected to the gearbox, and a twist spring mounted between the pedal and the two supporting arms for providing an elastic restoring force;
   a transmitting assembly mounted in the gearbox, the transmitting assembly including a driver, a first gear train engaged with the driver, a second gear train engaged with the first gear train, and a steering gear set simultaneously engaging with the first gear train and the second gear train; and
   a generator mounted adjacent to the gearbox, the generator having a rotor engaged with the second gear train;
   wherein when the pedal is pressed, the pedal driving the connecting rod to drive the transmitting assembly for rotating the rotor in a rotating direction to generate electric power;
   wherein when the pedal is released, the twist spring is pushed the pedal to be restored such that connecting rod is reversely driven by the pedal to drive the transmitting assembly, the transmitting assembly is continuously rotated the rotor in the same rotating direction.

2. The pedal power generating device as claimed in claim 1, wherein the gearbox has a cover mounted thereon for sealing the gearbox.

3. The pedal power generating device as claimed in claim 1 further comprising a casing mounted on the base, the casing having an opening defined therein for receiving the pedal and allowing the pedal extending from the opening, the casing having a handle pivotally mounted thereon, the casing having two electrodes disposed thereon and electrically connecting with the generator.

4. The pedal power generating device as claimed in claim 1, wherein the driver has a driving wheel disposed thereon and extending from the gearbox, the driving wheel having an annular groove radially defined therein, the connecting rod partially received in the groove and pivotally connected with the driving wheel.

5. The pedal power generating device as claimed in claim 4, wherein the driver has a driving gear disposed thereon and located adjacent to the driving wheel, the driving gear engaged with the first gear train.

6. The pedal power generating device as claimed in claim 1, wherein the second gear train has a driven gear, a first pinion co-axially mounted on the driven gear, and a second pinion co-axially mounted on the first pinion; the driven gear engaged with the rotor, the first pinion having an one-way bearing mounted therein and the second pinion having an one-way bearing mounted therein, the one-way bearing of the first pinion having an operational direction opposite to that of the one-way bearing of the second pinion such that the first pinion is rotated opposite to the second pinion, the first pinion engaged with the first gear train and the second pinion engaged with the steering gear set;
   wherein when the driver is rotated toward a first direction and is engaged with the first gear train to engage with first pinion such that the driven gear is engaged with the rotor and the rotor is rotated in the operating direction, the second pinion is idled;

when the driver is rotated toward a second direction opposite to the first direction and engaged with the first gear train, the first gear train is engaged with the steering gear set to engage with the second pinion such that the driven gear is continuously engaged with the rotor and the rotor is rotated in the same rotating direction, the first pinion is idled.

7. The pedal power generating device as claimed in claim 2, wherein the rotor has an extender sleeved thereon and extending from the cover, a freewheel mounted on the cover and engaged with the extender such that the freewheel is simultaneously rotated with the rotor.

\* \* \* \* \*